L. P. DUNN.
CONCRETE BURIAL VAULT FORM.
APPLICATION FILED FEB. 12, 1913.
1,170,430.
Patented Feb. 1, 1916.
3 SHEETS—SHEET 2.
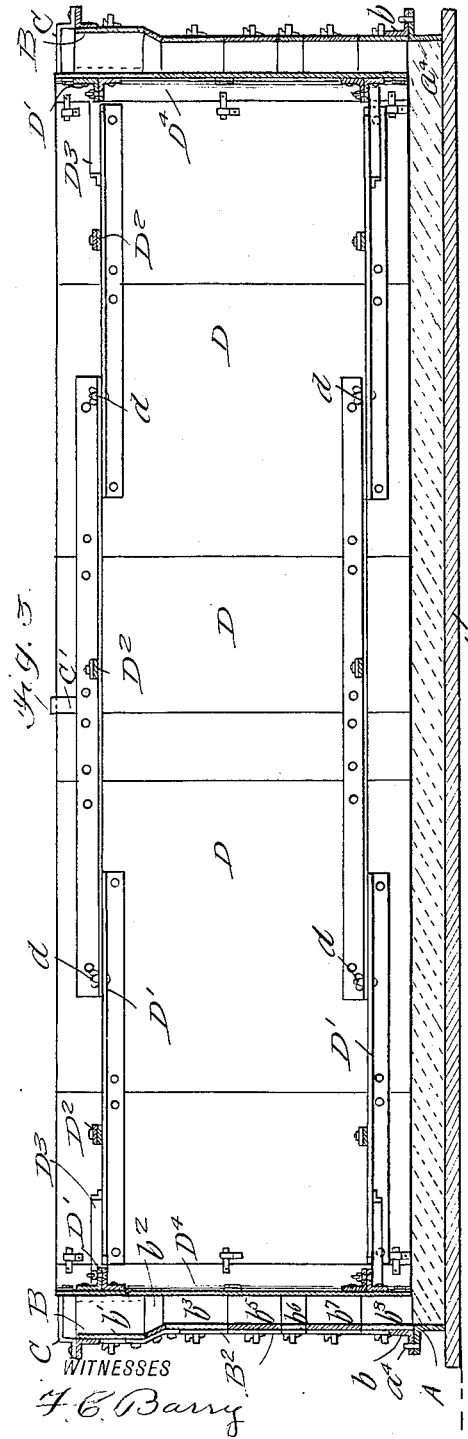
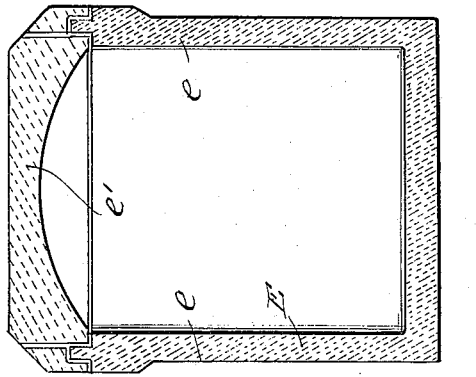
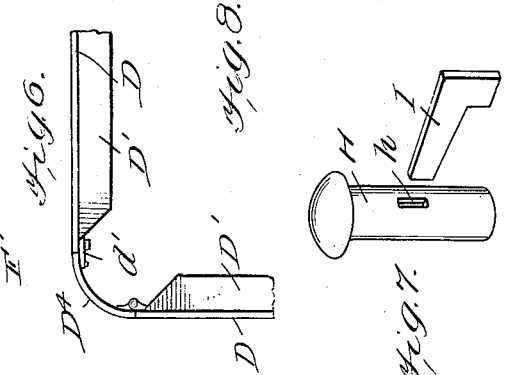
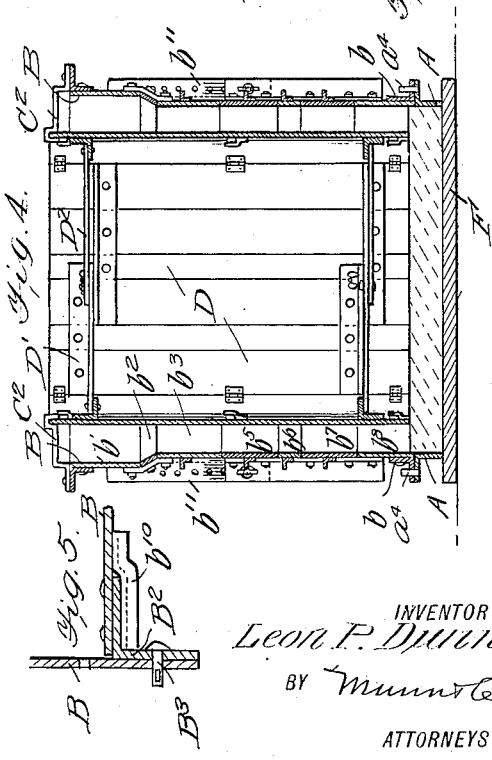
INVENTOR
Leon P. Dunn
BY Munn & Co.
ATTORNEYS
WITNESSES
F. E. Barry
Myron L. Clear

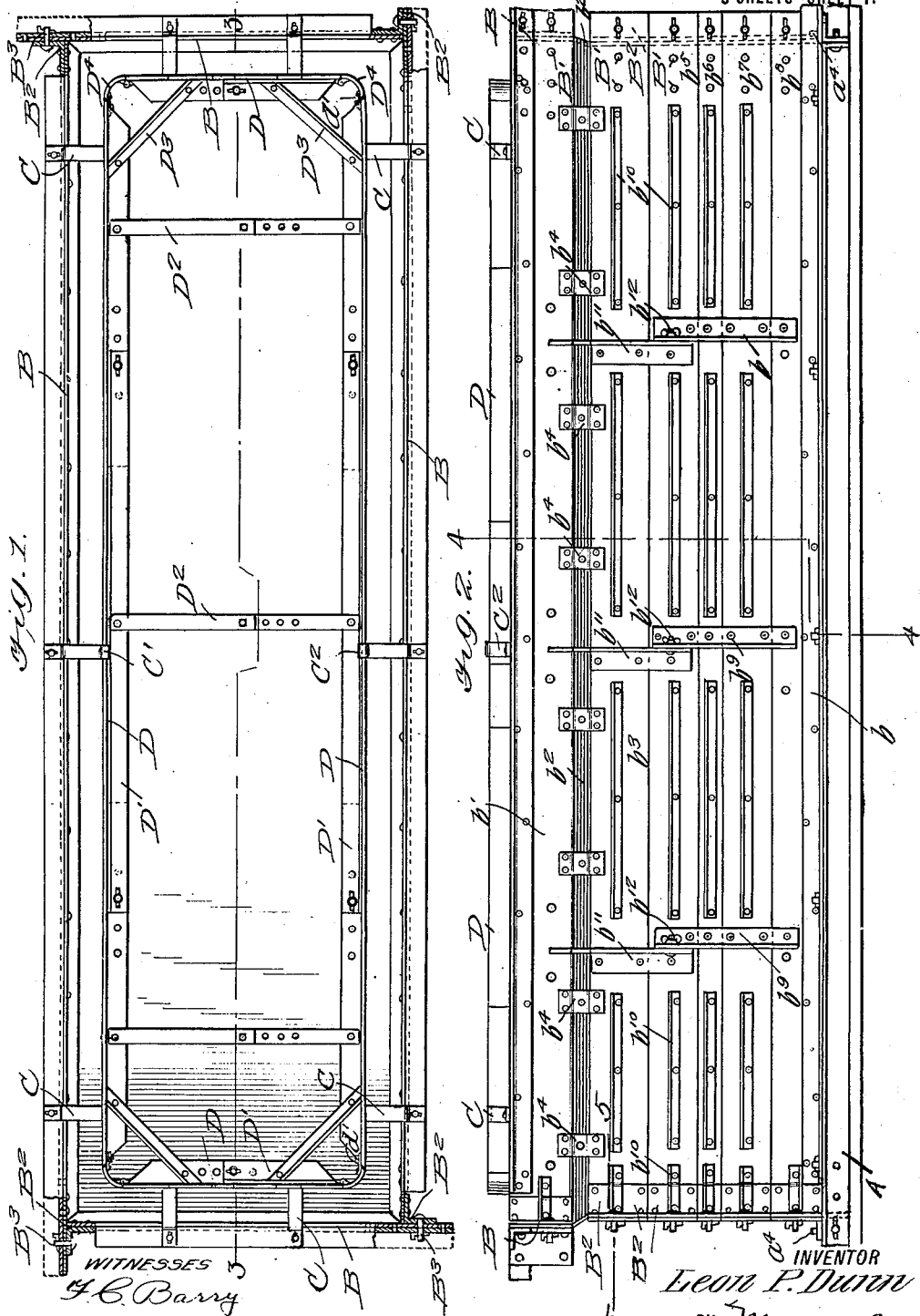

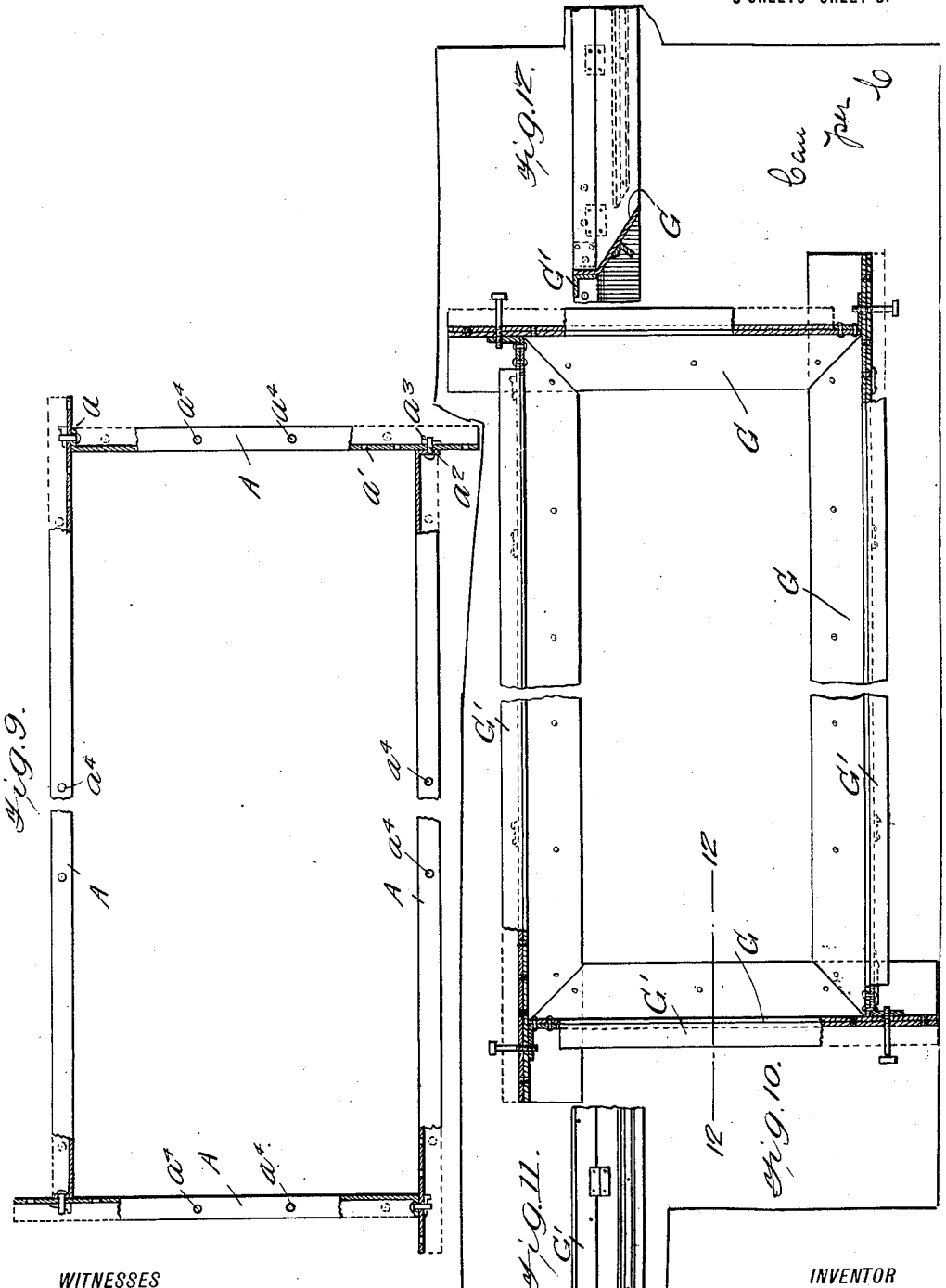

UNITED STATES PATENT OFFICE.

LEON PATRICK DUNN, OF TERRE HAUTE, INDIANA, ASSIGNOR OF ONE-HALF TO JOHN M. MARTIN, OF TERRE HAUTE, INDIANA.

CONCRETE-BURIAL-VAULT FORM.

1,170,430.  Specification of Letters Patent.  Patented Feb. 1, 1916.

Application filed February 12, 1913.  Serial No. 747,874.

*To all whom it may concern:*

Be it known that I, LEON P. DUNN, a citizen of the United States, and a resident of Terre Haute, in the county of Vigo and State of Indiana, have invented certain new and useful Improvements in Concrete-Burial-Vault Forms, of which the following is a specification.

This invention relates to molds for making burial vaults, watering troughs, etc., from concrete and other plastic materials, and has for its object to provide a mold of steel plates and angle iron which may be quickly adjusted in length, width and height, whereby to permit of the formation of structures of different sizes and dimensions.

A further object of the invention is to provide a mold including a supporting base which is adjustable to accommodate the adjusted mold sections and in which the base of the burial vault or watering trough may be formed before the mold sections for the walls are placed in position.

Other and further objects of the present invention tending to generally increase the durability and efficiency of the present class of devices will be readily understood from the following description, in which reference is made to the accompanying drawings forming a part of this specification and in which—

Figure 1 is a top plan view of the inner and outer mold sections in operative position on the base. Fig. 2 is a side elevation thereof. Fig. 3 is a vertical longitudinal section taken therethrough substantially on the line 3—3 of Fig. 1. Fig. 4 is a vertical transverse section taken therethrough on the line 4—4 of Fig. 2. Fig. 5 is a detail horizontal section through one corner of the outer mold section, taken substantially on the line 5—5 of Fig. 2. Fig. 6 is a plan view of one corner of the inner mold section. Fig. 7 is a detail perspective view of one of the locking pins and its key. Fig. 8 is a vertical cross section through a complete burial vault which may be formed by means of my improved mold, and Fig. 9 is a plan view of the supporting base, the corner portions thereof being broken away and in section.

Referring now to these figures, and more particularly to Fig. 9, the supporting base consists of a substantially rectangular frame composed of angle bars A, each of which is provided with a flanged and apertured end $a$ and with a longitudinal series of apertures $a'$ adjacent its opposite end for the reception of a locking pin $a^2$ extending from the flanged apertured end of the respective adjacent bar and adapted to be located therethrough by means of a key $a^3$. The several angle bars A may thus be adjusted in order that the frame which they form may be increased or decreased in size in accordance with the adjustment of the upper mold parts to be hereinafter described, the angle bars being provided with vertical apertures $a^4$ by which the outer mold may be secured thereto.

The outer mold as may be clearly seen from Figs. 1 to 4 inclusive, consists of four sides B, each of which is provided with an angle bar $b$ extending along its lower edge and apertured to receive locking pins for connecting the same upon the angle bars A of the base mold, and each of said sides B further including an upper section comprising longitudinal plates $b'$, $b^2$ and $b^3$ which are rigidly and permanently connected by braces $b^4$ and a lower section comprising longitudinal plates $b^5$, $b^6$, $b^7$ and $b^8$ which are secured together by means of transverse braces $b^9$. These longitudinal plates are preferably braced by means of small longitudinal angle bars $b^{10}$ riveted or bolted thereto and the upper section of each side of the mold is provided with transverse members $b^{11}$ which may be bolted by bolts $b^{12}$ to the braces $b^9$ whereby to connect the upper and lower sections of each side, it being understood that the said transverse braces $b^{11}$ are provided with a plurality of apertures as particularly illustrated in Fig. 4 in order that the two sections of each of the mold sides may be adjusted with respect to one another. Thus if the height of the mold is to be decreased, one of the strips, for instance the strip $b^5$, of the lower section of each of the mold sides is unbolted and removed and the bolts $b^{12}$ may then be removed and the upper section moved down so as to rest on the plate $b^6$ and again connected by the bolts $b^{12}$ through another aperture in each of the transverse braces $b^{11}$. Each of the sides B of the outer mold is provided with series of apertures B' through its several plates adjacent one end and is provided at its opposite end with a vertical angle bar B², in several sections corresponding to the several plates and apertured to receiving the locking pins B³ adapted to extend through selected series of apertures in the contiguous end of the adjacent side B, thus forming a rectangular frame in substantially the same way and adjusted in substantially the same manner as the frame constituting the base mold. Adjacent its upper edge, each of the outer mold sides B is provided with a longitudinal angle bar B⁴ to which may be adjustably secured inwardly extending spacing arms C adapted to engage the outer surface of the upper portion of the inner mold, and also arms C' which are provided at their inner ends with clips C² for engagement over the upper edges of the inner mold.

The inner mold comprises sides D each of which consists of a series of vertical plates which are removably connected by inner longitudinal angle bars D' having a series of apertures adjacent their contiguous ends whereby they may be adjustably connected to one another by bolts d, in this manner providing for the removal or addition of one or more plates whereby to shorten or lengthen the sides as desired. The inner mold is braced in operative position as indicated in Fig. 1 by means of the adjustable transverse braces D² and diagonal corner braces D³, each of the sides D having a curved corner piece hinged thereto at one end so as to occupy the space between the respective end thereof and the end of the adjacent side, these corner pieces being indicated at D⁴ and being engageable by latches d'. Thus when it is desired to mold a burial vault such as indicated at E in Fig. 8, the base mold shown in Fig. 9 is assembled in desired adjustment upon a pallet F and cement leveled therein, after which the inner and outer mold sections are disposed and connected in position particularly as indicated in Fig. 4 and cement is poured between the same in order to form the sides e of the vault.

From the foregoing description of the outer mold, it will be readily understood that the same may be selectively adjusted as to height without necessitating similar adjustment of the inner mold, both molds further being correspondingly adjusted where the vault is of special length or width. The top e' of the burial vault is formed within a mold of suitable construction, to fit upon the body thereof as shown in Fig. 8, and thus complete the vault for use.

In Fig. 7, I have shown a locking pin H provided with a transverse aperture h through which the key I may extend, the pin thus shown being preferred for use in detachably connecting the sides of the base and outer molds as previously described.

I claim:

1. The combination of an inner form or mold and an adjustable outer mold comprising four sides, each of said sides having at one end means whereby to adjustably connect the same to an adjacent side and each of said sides comprising an upper and a lower section, one of which sections embodies a plurality of independent plates which may be removed and added to, and adjustable connections between the said sections and each of the independent plates of the latter section.

2. The combination of a base mold embodying an adjustable frame, an adjustable outer mold connected to and supported by said base mold and comprising sides having a plurality of longitudinal plates and adjustable connections between the said plates, each of the plates having an angle bar at one end and a series of apertures adjacent its opposite end and locking pins carried by the said angle bars and adapted for engagement through selected apertures.

3. The combination of a base mold embodying an adjustable frame, an adjustable outer mold connected to and supported by said base mold and comprising sides each having horizontal plates forming upper and lower sections of which the lower sections are provided with adjustable connections between their plates whereby the latter may be removed or added to, adjustable connections between the sections of each side, the said longitudinal plates being each provided with an angle bar at one end and series of apertures at their opposite ends, and locking pins carried by the angle bars and adapted for engagement through selected apertures.

4. The combination of a base mold comprising angle bars having adjustable connections at their ends whereby to form a frame, an adjustable outer mold having angle bars secured along the lower edges of its sides and adapted for connection with the angle bars of the base mold, angle bars also extending along the upper edges of the sides of the outer mold, an inner mold or form disposed within the outer mold and spacing arms having connection with the upper angle bars of the outer mold sides and extending into contact with the sides of the inner mold, certain of which arms are provided with clips whereby to engage over the upper edges of the sides of the inner mold for the purpose described.

LEON PATRICK DUNN.

Witnesses:
Thomas Sears,
E. L. Wantland.